United States Patent

Mowen et al.

[11] 4,100,862
[45] Jul. 18, 1978

[54] 4-ROW TRAC PLANTER

[76] Inventors: Robert P. Mowen; Jacob D. Gettings, both of R.R. #4, Jerseyville, Ill. 62052

[21] Appl. No.: 779,737

[22] Filed: Mar. 21, 1977

[51] Int. Cl.² ............................................. A01C 5/00
[52] U.S. Cl. ........................................ 111/52; 111/85
[58] Field of Search ................... 111/1, 14, 19, 22, 24, 111/25, 28, 29, 32, 36, 37, 64, 54, 70, 71, 81, 83, 85, 78, 87, 52; 172/176, 573, 517; 56/238 R

[56] References Cited

U.S. PATENT DOCUMENTS

| 97,200 | 11/1869 | Keethler | 111/70 |
|---|---|---|---|
| 183,567 | 10/1876 | Houghtling | 111/22 |
| 216,120 | 6/1879 | Unthank | 111/28 |
| 462,223 | 10/1891 | Wells | 111/25 |
| 526,646 | 9/1894 | Weisel | 111/70 |
| 1,233,731 | 7/1917 | Vanderburg et al. | 172/517 |
| 2,466,555 | 4/1949 | Paine et al. | 172/517 X |
| 2,619,361 | 11/1952 | Connors et al. | 111/1 X |
| 3,026,828 | 3/1962 | Sabaitis | 111/82 |
| 3,219,000 | 11/1965 | Leach et al. | 111/85 X |
| 3,774,557 | 11/1973 | Esmay | 111/82 |

OTHER PUBLICATIONS

Anon. "With Interseeding . . . Two Full Crops a Year" Farm Journal, Nov., 1975, pp. 28, 29.

Primary Examiner—Edgar S. Burr
Assistant Examiner—James R. Feyrer
Attorney, Agent, or Firm—C. A. O'Brien; H. B. Jacobson

[57] ABSTRACT

A frame is provided from which front and rear pairs of opposite side wheels are journalled. A prime mover is mounted on the frame and drivingly connected to at least one pair of the wheels thereof. The frame defines a longitudinal center line and the wheels are disposed in four vertical planes paralleling the center line and spaced equally apart transversely of the frame. The wheels include narrow outer peripheral portions adapted, due to the gross weight of the planter, to form narrow depressed tracks in cultivated ground over which the planter travels and each of the wheels has seed planting structure operatively associated therewith and to discharge seeds into the depressed ground tracks at a metered rate. The axes of rotation of the wheels are spaced below the frame of the planter and each wheel has a rearwardly opening V-shaped wheat divider or similar crop stand divider operatively associated therewith for parting the crop stand through which the planter is being moved immediately ahead of the wheels of the planter.

3 Claims, 7 Drawing Figures

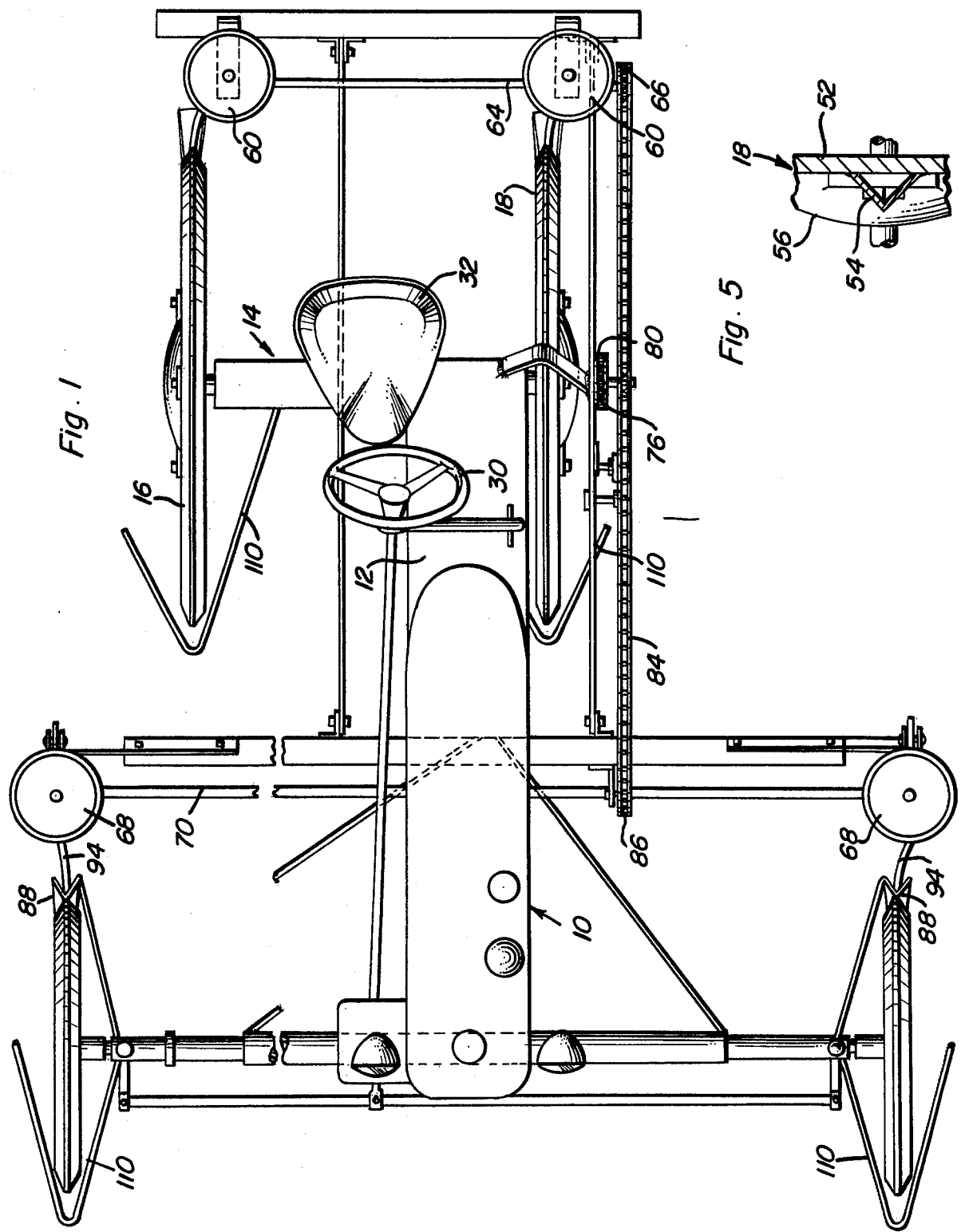

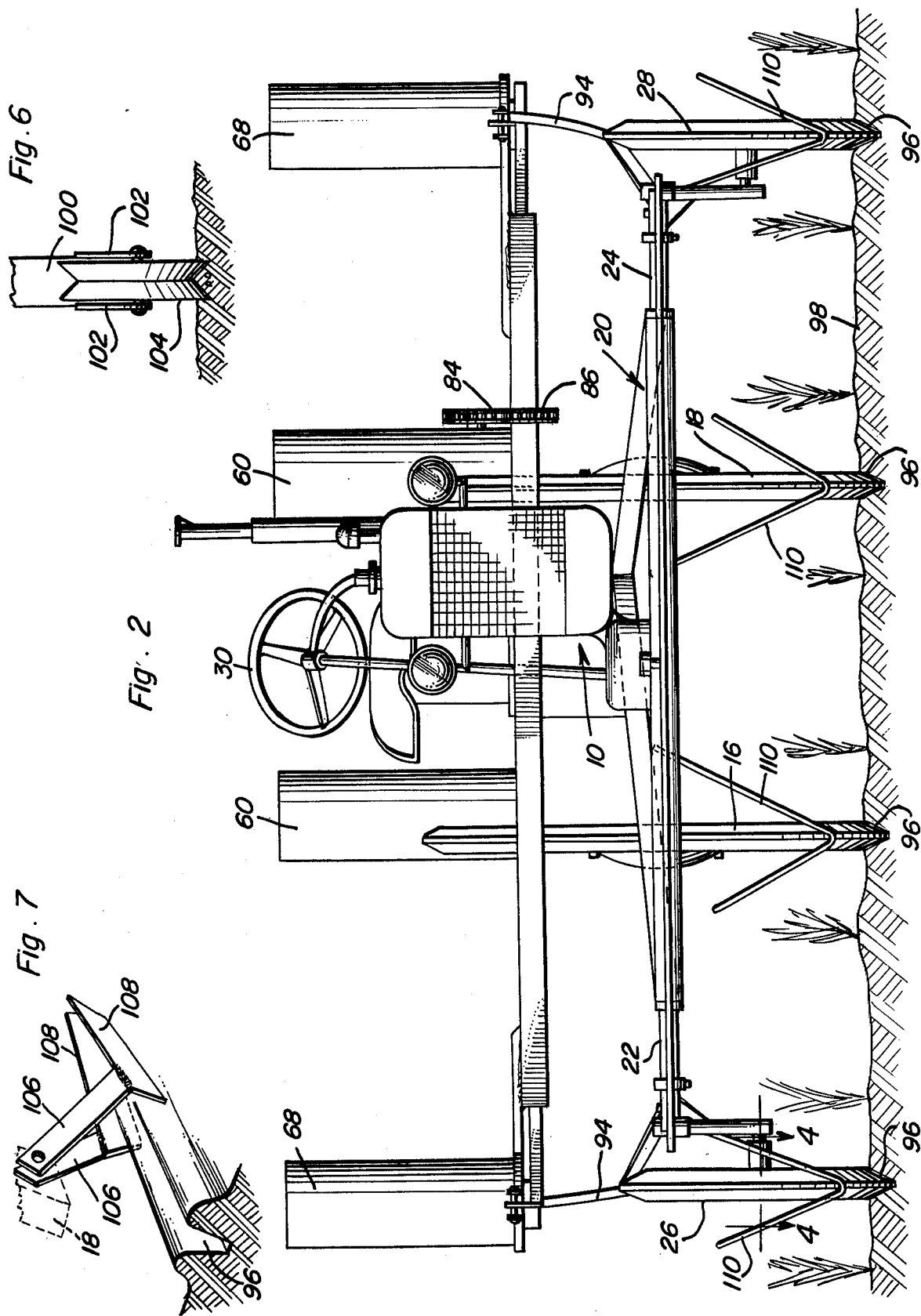

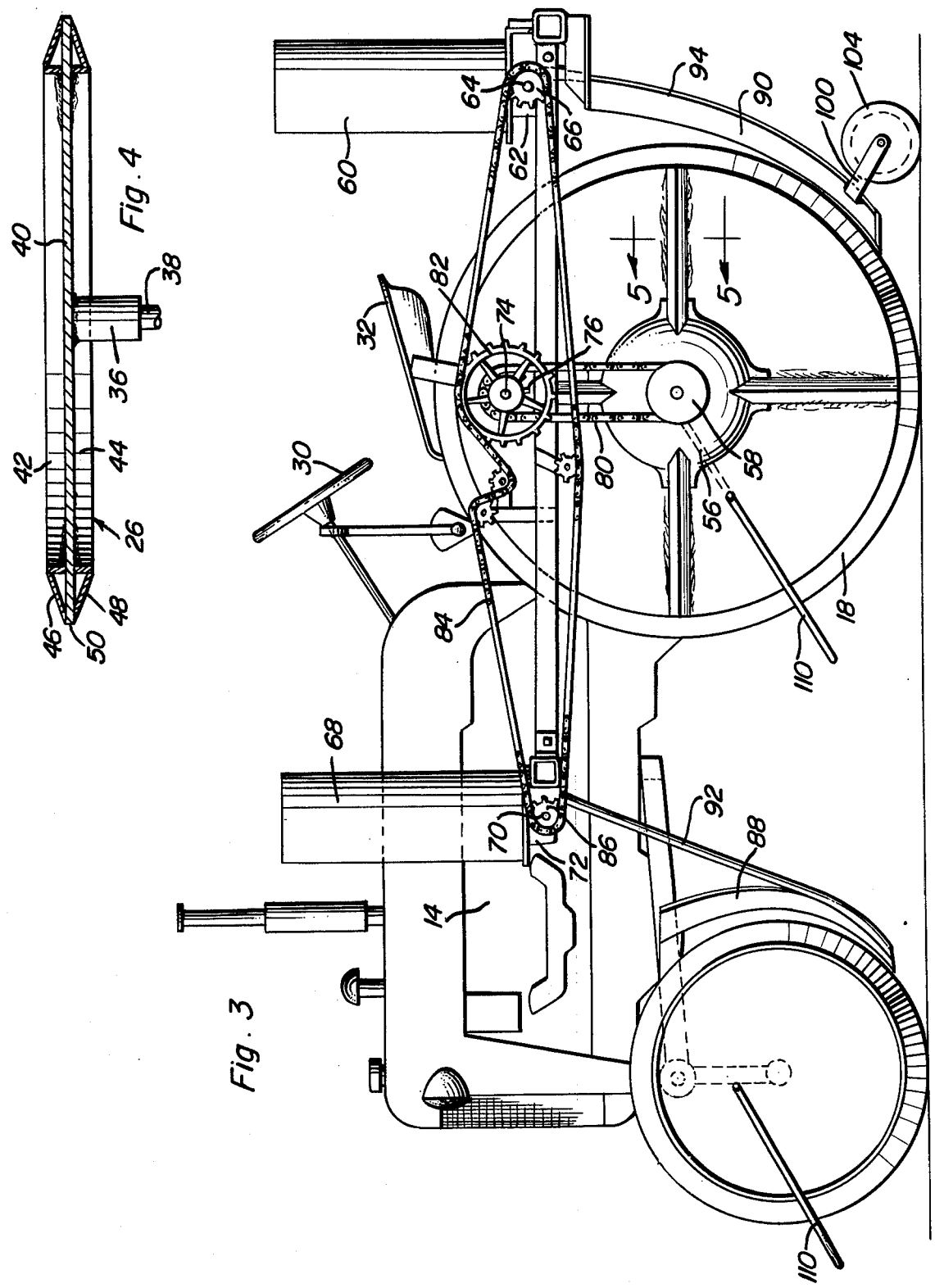

4-ROW TRAC PLANTER

BACKGROUND OF THE INVENTION

Heretofore various forms of agricultural equipment have been designed for use in trac planting wherein a groove is formed in agricultural land by a rolling wheel or disc having a sharp outer periphery. Seed dispensing apparatuses have been operatively associated with such wheels or discs for planting seeds in the ground tracks made by the narrow periphery wheels or discs. However, this type of planting has not been carried out prior to harvesting a standing crop.

In certain localities in this country a second crop can be planted after harvesting the main crop, but there is often too little moisture within the upper layers of the ground to support germination of the seed of the second crop once the first crop has been harvested. On the other hand, if a means could be provided for planting the seeds of the second crop in a standing first crop two to three weeks prior to harvesting of the first crop, the ground would be shaded against rapid water evaporation due to the sun and wind during the period it takes for the seeds of the second crop to germinate. Accordingly, a need exists for a planter which may be utilized to plant a second crop in a standing first crop such as wheat two to three weeks before harvesting of the standing wheat crop.

Examples of trac planting devices including some of the general structural and operational features of the instant invention are disclosed in U.S. Pat. Nos. 9,879, 123,121, 340,103, 1,035,432, 1,078,792, 1,747,525 and 3,026,828.

BRIEF DESCRIPTION OF THE INVENTION

The planter of the instant invention includes an elevated prime mover frame from which front and rear pairs of opposite side ground wheels are journalled and the frame includes a motor drivingly connected to at least one pair of the wheels. The outer peripheral portions of the wheels are narrow and V-shaped in cross-sectional shape in order to form narrow depressed tracks in cultivated ground over which the planter travels and seed planting structure is supported from the frame and includes seed discharging structure operative to discharge seeds into the depressed ground tracks formed by the wheels.

The main object of this invention is to provide a planter which will be operative to move through a standing crop such as wheat and plant seeds for a second crop prior to harvesting the first crop in order that the latter may facilitate the retention of moisture in the ground for sufficient time to enable the seeds of the second crop to be germinated immediately after which the first crop may be harvested with little damage to the germinated second crop.

Another object of this invention is to provide a planter in accordance with the preceding objects and constructed in a manner whereby the frame of the planter is elevated above the vertical midportions of the wheels.

Yet another object of this invention is to provide a planter including rearwardly opening V-shaped dividers operatively associated with the wheels of the planter for parting the standing crop immediately forwardly of the wheels of the planter.

A final object of this invention to be specifically enumerated herein is to provide a trac planter in accordance with the preceding objects and which will conform to conventional forms of manufacture, be of simple construction and easy to use so as to provide a device that will be economically feasible, long-lasting and relative trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a planter constructed in accordance with the present invention, forward right-hand portions of the planter being broken away;

FIG. 2 is a front elevational view of the assemblage illustrated in FIG. 1;

FIG. 3 is a side elevational view of the planter;

FIG. 4 is an enlarged fragmentary horizontal sectional view taken substantially upon the plane indicated by the section line 4-4 of FIG. 2;

FIG. 5 is an enlarged fragmentary vertical sectional view taken substantially upon the plane indicated by the section line 5-5 of FIG. 3;

FIG. 6 is a fragmentary enlarged rear elevational view of a seed covering wheel; and FIG. 7 is a perspective view of a second form of seed covering attachment.

DETAILED DESCRIPTION OF THE INVENTION

Referring now more particularly to the drawings the numeral 10 generally designated the planter of the instant invention. The planter 10 is basically an I.H.C. Cub tractor including a main frame 12 from which a motor 14 is supported. The frame 12 supports a narrowed rear axle assembly referred to in general by the reference numeral 14 from which a pair of closely spaced apart rear wheels 16 and 18 are journalled. The front end of the tractor includes a front axle assembly referred to in general by the reference numeral 20 and the axle assembly 20 includes extendible opposite end sections 22 and 24 from which front steerable wheels 26 and 28 are supported. The tractor 10 includes a conventional steering wheel 30 behind which a seat 32 for the operator of the tractor 10 is provided and the steering wheel is operatively connected to the wheels 26 and 28 for steering those wheels.

From FIG. 2 of the drawings it may be seen that the wheels 16, 18, 26 and 28 are disposed in equally spaced apart vertical planes extending longitudinally of the planter 10. The front wheels 26 and 28 each comprise center hub portions 36 rotatably journalled on steerable spindle shafts 38 and each of the hubs 36 supports a circular disc 40 including opposite side cylindrical rings 42 and 44 spaced slightly inwardly of its outer periphery and frusto-conical rings 46 and 48 are secured between the rings 42 and 44 and the outer peripheral edge 50 of the disc 40. In this manner, the outer peripheries of the wheels 26 and 28 are V-shaped with their apex portions facing radially outwardly away from the hub portions 36.

The wheels 16 and 18 are similarly formed, except that the larger diameter discs 52 of the wheels 16 and 18 corresponding to the discs 40 include radial bracing members 54 which are generally V-shaped in cross-section and are secured to the outer surfaces of the discs 52.

In addition, the central portions of the wheels 16 and 18 include domed center portions 56 secured to the outer surfaces thereof and the domed portion 56 of the wheel 18 includes a drive sprocket 58 supported therefrom.

A pair of rear seed boxes 60 are supported from the frame and include seed dispensing structures 62 having a drive input shaft 64 upon which a sprocket wheel 66 is mounted. The shaft 64 extends between the rear seed box dispensing structures 62 whereby the latter may be driven from the single shaft 64 and a pair of similar seed boxes 68 are supported from a forward portion of the frame 12 and a drive shaft 70 extends between and drivingly interconnects the seed dispensing structures 72 of the seed boxes 68. A jack shaft 74 is journalled from the frame 12 and has a first sprocket wheel 76 mounted thereon aligned with the sprocket wheel 58 and an endless drive chain 80 is trained about the sprocket wheels 58 and 76. A second sprocket wheel 82 is mounted on the jack shaft 74 and an endless drive chain 84 is trained about the sprocket wheels 66 and 82 as well as a sprocket wheel 86 corresponding to the sprocket wheel 66 mounted on the shaft 70.

The frame 12 additionally includes depending supports 88 and 90 which depend downwardly behind the front and rear wheels 26, 28 and 16, 18 of the planter 10 and seed discharging tubes 92 and 94 depend downwardly from the structures 72 and 62 to the lower ends of the supports 88 and 90 whereby seed metered from the boxes 68 and 60 and into the tubes 92 and 94 may be discharged into the narrow V-shaped ground tracks 96 formed in the ground 98 by movement of the wheels 16, 18, 26 and 28 thereover.

The depending supports 88 and 90 may each include a rearwardly and downwardly extending bifurcated support 100 between whose furcations 102 a grooved press wheel 104 is journalled. The press wheels 104 will be operative to cover the seeds deposited into the tracks 96 with at least a thin layer of soil. Alternately, the supports 88 and 90 may each include a pair of opposite rearwardly and downwardly inclined arms 106 supporting opposite and rearwardly convergent blade members 108 for laterally displacing dirt from opposite sides of the tracks 96 thereinto over the seeds deposited in the tracks 96.

Finally, each of the wheels 16, 18, 26 and 28 has a V-shaped standing crop parting guide 110 operatively associated therewith whereby a standing crop through which the planter is being moved may be parted immediately forwardly of the wheels 16, 18, 26 and 28 in order to minimize damage to the standing crop which will be "headed out" at the time the planter 10 is utilized to plant a second crop within the standing crop.

In certain areas of this country wheat is grown and the wheat is harvested in months which are relatively dry. Accordingly, it is difficult to obtain germination of the seeds of a second crop after the wheat crop has been harvested due to the rapid evaporation of ground moisture as a result of wind and sun. However, the planter of the instant invention may move smoothly through a standing wheat crop with little damage to the "headed out" wheat crop approximately three weeks before the wheat is to be harvested. The planter is operative to plant seeds of a second crop such as soybeans or grain sorghum in the standing first crop whereby the latter will shade the ground against the sun and shield the ground against wind during the three-week period the seeds of the second crop germinate. Then, after germination of the seeds of the second crop the first crop (wheat) may be harvested with little damage to the germinated second crop and the germination of the seeds of the second crop prior to the first crop being harvested will substantially ensure a productive second crop.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trac planter comprising a frame including journalled narrow front and rear pairs of opposite side wheels, a prime mover mounted on said frame and drivingly connected to at least one pair of said wheels, said frame defining a longitudinal center line, said wheels being disposed in four vertical planes paralleling said center line and spaced equally apart transversely of said frame, said wheels including narrow outer peripheral portions adapted, due to the gross weight of said planter, to form narrow depressed tracks in cultivated ground over which said planter travels, and seed planting means supported from said frame and including narrow depending seed discharging means disposed immediately rearwardly of each of said wheels, in the corresponding vertical plane, and operative to discharge seeds into the depressed ground tracks formed by said wheels, the outer peripheral portions of said wheels being generally V-shaped in cross-sectional shape with their apex portions facing generally radially outwardly of the corresponding axes of rotation of said wheels, each of said wheels having a rearwardly and upwardly opening and inclined generally V-shaped standing crop divider operatively supported from said frame immediately ahead of the lower forward quadrant of the corresponding wheel, said frame, other than said depending seed discharging means and said standing crop dividers being devoid of portions thereof projecting more than slightly below the axes of rotation of said wheels, the lower portions of said wheels, below elevations thereon spaced only slightly below said axes of rotation thereof, being of axial thicknesses no greater than the width of said outer peripheral portions, said wheels being supported from said frame with their axes of rotation spaced below said frame.

2. The combination of claim 1 wherein said seed planting means includes a plurality of seed boxes supported from said frame, and driven seed dispensing means for receiving seeds from said boxes and dispensing seeds at a metered rate to said seed discharging means proportional to the speed of rotation of one pair of said wheels.

3. The combination of claim 1 including narrow ground implements supported from said frame immediately behind each wheel and oprative to laterally displace dirt into said depressed ground tracks over the seeds discharged thereinto.

* * * * *